March 10, 1953
H. J. McDERMOTT
2,630,668
LAWN MOWER WITH AUXILIARY CUTTER-FEEDER
Filed Aug. 22, 1951
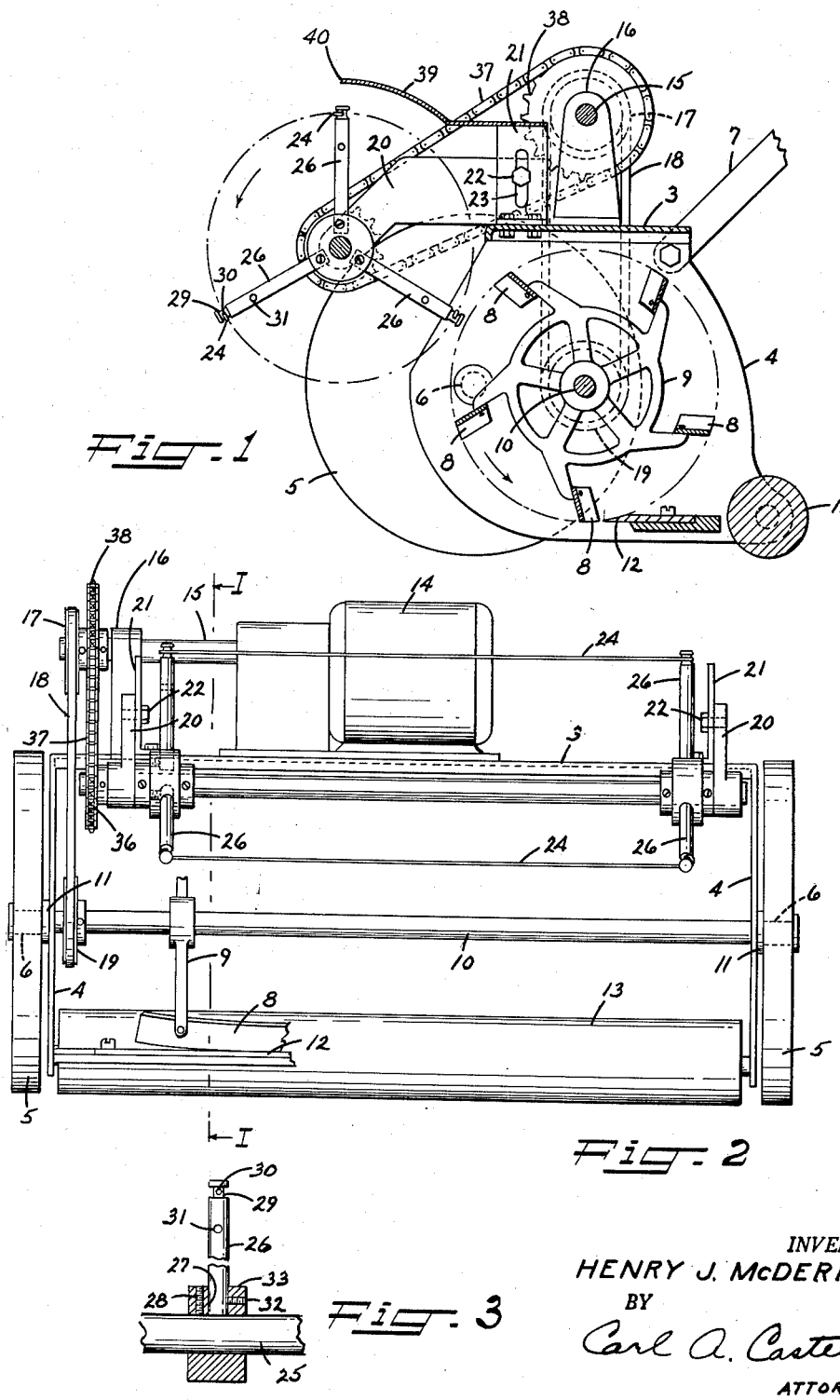
INVENTOR.
HENRY J. McDERMOTT
BY
Carl A. Castellan
ATTORNEY.

Patented Mar. 10, 1953

2,630,668

UNITED STATES PATENT OFFICE 2,630,668

LAWN MOWER WITH AUXILIARY CUTTER-FEEDER

Henry J. McDermott, Collingdale, Pa.

Application August 22, 1951, Serial No. 243,035

9 Claims. (Cl. 56—238)

This invention relates to lawn mowers and the like and it is particularly concerned with an improvement or attachment to mowers for modifying the conventional type of rotary reel mower so that it will cut high grass as well as lawn grass of normal height.

Various systems have already been suggested for this purpose. For example, secondary cutting reels have been provided above and in front of the main cutting reel for the purpose of reducing the height of the tall grass before the main reel reaches it. These systems require additional cutting blades which are costly and must be constantly sharpened. Another system involved the use of an auxiliary feeder reel or conveyor comprising a plurality of rods or bars carried between a pair of endless chains or ring gears and so driven that each bar in succession passes over a bunch of the tall grass and then moves downwardly toward the cutter reel bending the tall grass into the path of the blades of this reel. In some of these latter systems, the bars are so arranged that they enter between the helical blades of the reel; hence, the bars must be inclined out of parallel with the axis of the reel in order to avoid interfering with the helical blades. Such inclination allows the tall grass freedom to slide along the bars so that as it nears the rotary reel, the windage developed by the reel may cause the grass to escape from the bars. In all of the feeding type of systems, the rods or bars themselves create windage and blow the grass down in front of the mower thereby defeating their purpose or at best serving their purpose in an unreliable, haphazard fashion. They are also expensive in initial cost.

It is an object of the present invention to provide an improved system for mowing lawns or fields and for modifying rotary reel lawn mowers of conventional construction so that they will efficiently cut tall grass as well as that of normal height in lawns. It is a further object to provide a system for this purpose which can readily be attached to existing lawn mowers or can be built into lawn mowers at the time of their manufacture with a relatively small increase in cost. A further object is to provide for modifying a conventional rotary reel lawn mower, a system which acts partially as an auxiliary or secondary cutter and also as a feeder or conveyor for the main cutter reel, but which is relatively simple in construction and requires a minimum of parts and generally less expensive parts than the systems heretofore devised or proposed. Other objects and advantages of the invention will be apparent from the drawing and the description thereof hereinafter. In the drawing, which is illustrative of the invention, Figure 1 is a sectional view taken on line I—I of Figure 2 showing the relationship of the present invention to the main cutter reel of a lawn mower, Figure 2 is a front elevation, and Figure 3 is a view of a detail.

The drawing shows a lawn mower comprising a frame having an upper panel 3 and side plates 4. The mower wheels 5 are rotatably mounted on stub shafts 6. The wheels may be driven or not, as desired. A bracket 7 may extend from each side plate 4 to a handle by which the operator may control or guide the mower. The mower also comprises a rotary reel comprising the helically arranged blades 8 disposed about the axis of a shaft 10. The blades are mounted on a plurality of spaced spiders 9, the hubs of which are fixedly secured to the shaft 10 which is rotatable in bearings 11 in side plates 4. The blades 8 cooperate with the bed knife 12 which may be adjustably secured to the side plates 4 of the frame in any conventional manner. A back roller 13 may be adjustably mounted between the side plates 4 in conventional fashion to provide the usual adjustment for the height of cut of the main cutter reel.

A motor and reduction gear may be provided in a housing 14 on the panel 3 for rotating the main drive shaft 15 in its bearing 16. This shaft 15 may be provided with whatever sprockets, pulleys, or gears are needed to drive the main cutter reel, the wheels, and the auxiliary device of the invention to be described below. A pulley 17 is fixed on the end of the shaft and drives a belt 18 which in turn drives the pulley 19 fixed on shaft 10.

The auxiliary device of the invention is rotatably mounted on suitable bearings in the outer ends of the arms 20 which are secured at their inner ends to the brackets 21 by bolts 22. The brackets 21 are secured to the frame panel 3, as by bolting, and the bolts 22 pass through slots 23 in the brackets 21 so that the arms are adjustable in height, and inclination is desired.

The auxiliary device comprises at least one, and preferably a plurality of, wires 24 (such as two, three, or four), extending transversely of the mower and mounted for rotation about an axis such as that of the shaft 25, which may be hollow to provide strength and lightness in weight. Three wires are actually shown in the drawing. Each wire is held taut between end supporting rods 26 so that it extends in a direction that is substantially parallel to its axis of rotation.

Figure 3 shows one manner of securing the ends of the wire or wires to the rods 26. The outer end of rod 26 is provided with a circumferential groove 29. A transverse bore 30 extends through the neck or groove and receives the end of the wire 24. The rod 26 may be provided with a transverse bore or slot 31 to temporarily receive a rod or pin to enable the operator to turn the rod 26 within the bore 27 of the hub 33 which may be secured to the shaft 25, such as by a key or set screw 28, thereby coiling the ends of the wire 24 in the groove 29 to obtain the desired tautness therein. When the wire is drawn up tautly, the set screw 32 is tightened to hold the respective rod 26. The rod or rods 26 at one end may be formed integrally with the hub 33 in which case one end of the wire 24 is inserted through a bore 30 of the integral rod or of one of the integral rods 26, and then wrapped about the groove 29 by one-half to two or more turns, the other end of the wire being then inserted through the bore of the rotatable rod 26 at the other end of the device. This rotatable rod is then turned in its bore 27 to provide the desired tautness, after which the rod is set with its set screw 32.

When several wires are used, they may be plucked to check their tautness. When the same sound pitch is emitted upon plucking the several wires, there is uniformity in the tension in the several wires and balanced forces are impressed upon the shaft 25. These forces are exerted upon the shaft through the hubs 33 to which rods 26 are rigidly secured and through the collars 34 which are fixedly secured to shaft 25. Spacer collars 35 may be provided between hubs 33 and the ends of arms 20. While reliance may be placed upon the friction between collars 34 and hubs 33 to transmit rotation from shaft 25 to the wire 24 or cage of such wires, it is preferred to key the hubs 33 to shaft 25. When more than one wire is used, the rods 26 should be spaced equidistantly about each hub 33.

The auxiliary device is driven in the direction of the arrow in Fig. 1, such as by a sprocket 36 keyed to shaft 25, chain 37, and sprocket 38 keyed to drive shaft 15.

A guard 39 may be secured, such as on the brackets 21, in position over the auxiliary device. The guard is preferably a sheet of metal, shaped arcuately to be generally concentric with the auxiliary rotary device, and has its outermost edge 40 approximately over the axis of the auxiliary rotor.

The wire or wires used may be of various sizes from No. 16 to No. 24 or slightly smaller. They must be tautly mounted and the finer the wire the more the cutting action that is exerted. Thus, wire having a diameter of about 0.05 inch may serve to feed with relatively little or no cutting whereas finer wire having a diameter of 0.02 inch, such as No. 24, may, in some types of grass and weeds, serve to cut all, or substantially all, of the tall growth, with results in operation described below.

In operation, the wires are driven through a circular path as viewed in Fig. 1 in the direction of the arrow therein. They pass up and over and then down in back of tall grass immediately in front of the mower. Then they move the grass thus embraced toward the main cutter reel and deflect it toward that reel in such a manner that the tall grass is caught between adjacent blades and thereby positively drawn by such blades into proper cutting position against the bed knife 12. Preferably the linear speed of the wires is in excess of the speed of travel of the mower, or in other words greater than (and preferably far greater than) the linear speed of the mower wheels, whether the mower is power-driven or hand-pushed, so that the wire will bend the grass back into the path of the rotating blades, and especially so that such a blade will trap the bent grass as the blade nears the beginning of its last quadrant of travel to the bed knife. When so caught, the grass cannot escape, but is effectively cut.

The drawing shows an auxiliary feeding and cutting device in which the wires travel in a path the radius of which is approximately the same as that of the cutter reel and the axis of which is approximately at the same height as the top of the cutter reel path. These relationships may be changed but the path of the wire or wires should be as near as possible to a tangential relationship with the cutter reel path without clashing therewith. By disposing the wires at a greater radius from their axis of rotation or by setting their axis higher, or by doing both, the mower can effectively handle taller grasses.

By so setting the auxiliary device that the lowest point of the path of the wire is approximately in or below a horizontal plane through the axis of the cutter reel, the wire effectively deflects the tall grass into the blades of the main cutter reel and may, as stated above, cut part or substantially all of such grass to a height not above the axis of the main cutter reel so that the remaining stems or stalks, if any, of such grass are positively engaged by the main cutter reel in normal fashion.

The feeding and cutting action of the auxiliary device is unaccompanied by any appreciable windage which might otherwise tend to lay the tall grass down in front of the mower in such a manner that the mower can pass over the tall grass without cutting it. The extent to which the device serves to cut the grass depends a great deal upon the particular grass and the fineness of the wire used. However, it serves to feed, convey, or deflect the tall grass that it does not cut into the main cutter reel in such manner that the grass cannot escape being cut to a uniform height, the same as the rest of the grass is cut. The cutting action does not depend on sharpening or roughening of the wire on one or more of its sides, although the wire or wires may be sharpened or roughened, if desired. In general, a simple wire of smooth, round cross-section is preferred because of its inexpensiveness, but wires of other cross-sections, such as flat, square, triangular, or oblong, may be used if desired. The wire is preferably made of a rust-resistant material of high tensile strength, such as a hard-drawn stainless steel wire or one of other alloys, such as Monel metal or even ordinary music wire.

Light-weight, taut wires are particularly adapted to high speed rotation since they do not undergo any appreciable amount of deflection under the action of centrifugal force. High speed is important for obtaining optimum cutting and/or feeding efficiency by the wires.

The wire is relatively safe since upon breakage, the broken end merely wraps around the shaft 25 where it can harm neither the operator nor the other parts of the mower, such as the blades.

As stated above, the auxiliary device of the invention is relatively inexpensive because it is made up of few and simple parts. It can be designed as a regular component of any type of rotary reel lawn mower whether it is hand-driven, power-driven, or partially hand- and partially power-driven. Alternatively, it can be designed and built for sale as a separate attachment for any mower.

If desired, the rotating wire assembly hereinabove called "the auxiliary device" may be the sole cutting member of the mover, whether it comprises one or a plurality of wires. When so used, it may be mounted in the normal position occupied by a rotary cutter reel, such as that having blades 8 in the embodiment shown. The bed-knife 12 may or may not be used with such a wire reel but, if used, it would not engage the wire or wires. Such a mower could be provided with an auxiliary wire reel of the some construction as the main wire cutter reel and located in the same relative position with respect to the main reel as the auxiliary device shown in the drawing.

It is to be understood that changes and variations may be made without departing from the spirit and scope of the invention as defined in the appended claims.

I claim:

1. A mower for lawns or the like comprising a frame, a rotary cutter mounted on the frame, an auxiliary device mounted rotatably on the frame ahead of the rotary cutter with its axis of rotation above and ahead of that of the rotary cutter and generally parallel thereto, said auxiliary device comprising a beating and cutting wire, a pair of axially spaced supporting elements connected to the wire adjacent its ends for mounting the wire in a taut condition generally parallel to the axis of the rotary cutter for rotation in a path which approaches closely to the rotary cutter and intersects an approximately horizontal plane through the axis of the rotary cutter, and a rigid member rigidly connected to said elements, and driving means operatively connected to the supporting elements for rotating the wire at high speed about the axis of the auxiliary device in the same direction as the rotary cutter.

2. A mower for lawns or the like comprising a frame, a rotary cutter mounted on the frame, an auxiliary device mounted rotatably on the frame ahead of the rotary cutter with its axis of rotation above and ahead of that of the rotary cutter and generally parallel thereto, said auxiliary device comprising a plurality of beating and cutting wires, a pair of hubs, a pair of axially spaced supporting elements extending radially from the hubs and connected to each wire adjacent its ends for mounting the wire in a taut condition generally parallel to the axis of the rotary cutter for rotation in a path which approaches closely to the rotary cutter and intersects an approximately horizontal plane through the axis of the rotary cutter, and a rigid member rigidly connected to said elements, and driving means operatively connected to the hubs for rotating the wires at high speed about the axis of the auxiliary device in the same direction as the rotary cutter.

3. A mower for lawns and the like comprising a frame, a rotary cutter mounted on the frame, an auxiliary device comprising a rotatable shaft mounted on the frame with its axis above and ahead of that of the rotary cutter and generally parallel thereto, a beating and cutting wire, means connected to the shaft and the wire for mounting the wire in a taut condition generally parallel to the shaft for rotation thereby in a path concentric therewith which approaches closely to the rotary cutter and intersects an approximately horizontal plane through the axis of the rotary cutter, and driving means operatively connected to the shaft for rotating the auxiliary device at high speed to turn the wire about the shaft in the same direction as the rotary cutter.

4. A mower for lawns and the like comprising a frame, a rotary cutter mounted on the frame, an auxiliary device comprising a shaft mounted on the frame with its axis above and ahead of and generally parallel to the axis of the rotary cutter, said device comprising a plurality of substantially parallel beating and cutting wires, rigid members connected to the shaft and the wires for mounting the wires substantially concentrically and equi-angularly spaced about, and generally parallel to, the shaft, and driving means operatively connected to the shaft for rotating the wires about the axis of the shaft through a path close to the rotary cutter and intersecting an approximately horizontal plane through the axis of the rotary cutter.

5. A mower as defined in claim 4 in which the rigid members extend radially from the shaft and each wire is connected adjacent its ends to a pair of such rigid members spaced axially along the shaft.

6. A mower as defined in claim 4 in which the rigid members are radially extending rods arranged in two groups thereof spaced axially of the shaft, each rod in one group being paired with a corresponding and similarly oriented rod in the other group, at least one of the rods of each such pair being rotatable in a hub fixed on the shaft about an axis extending in the direction of the length of the rod, and means is provided for adjustably securing the rod in its hub.

7. A mower as defined in claim 6 in which each rod is circumferentially grooved near its outer end to receive a turn of the wire, and each rod has a transverse bore in the grooved neck to receive the end of the wire.

8. A lawn mower attachment comprising a shaft, a pair of hubs on the shaft, a plurality of pairs of rods rigidly connected to, and extending radially from, the hubs, said pairs of rods being substantially equi-angularly spaced apart about the hubs, a plurality of substantially parallel wires, each mounted concentrically about the shaft and attached adjacent its ends to a pair of said rods, at least one rod of each pair being rotatable in its hub about an axis extending in the direction of the rod to tighten the wires, and means for adjustably securing each rotatable rod rigidly to its hub.

9. A mower attachment as defined in claim 8 in which each rod is circumferentially grooved near its outer end to receive a turn of the wire, and each rod has a transverse bore in the grooved neck to receive the end of the wire.

HENRY J. McDERMOTT.

REFERENCES CITED

The following references are of record in the file of this patent:

UNITED STATES PATENTS

| Number | Name | Date |
|---|---|---|
| 448,230 | Guichard | Mar. 17, 1891 |
| 762,168 | Heydrick | June 7, 1904 |
| 987,365 | Howard | Mar. 21, 1911 |
| 1,394,351 | Pribnow | Oct. 18, 1921 |
| 2,094,345 | Bootes | Sept. 28, 1937 |
| 2,104,343 | Fish | Jan. 4, 1938 |
| 2,193,276 | Frush | Mar. 2, 1940 |
| 2,273,221 | Roundy | Feb. 17, 1942 |
| 2,455,505 | Lamy | Dec. 7, 1948 |